(12) United States Patent
Mizoguchi

(10) Patent No.: US 6,222,994 B1
(45) Date of Patent: Apr. 24, 2001

(54) FILM UNIT WITH A LENS ATTACHED

(75) Inventor: Shuri Mizoguchi, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/295,197

(22) Filed: Apr. 20, 1999

(30) Foreign Application Priority Data

Apr. 24, 1998 (JP) .................................................. 10-131336

(51) Int. Cl.⁷ .............................. G03B 1/10; G03B 17/02
(52) U.S. Cl. .................................. 396/6; 396/387; 396/411
(58) Field of Search ................................. 396/6, 387, 411, 396/413

(56) References Cited

U.S. PATENT DOCUMENTS 3,736,015   5/1973   Dierks et al. .
5,923,905 * 7/1999   Solomon ................................. 396/6

FOREIGN PATENT DOCUMENTS 2138094     10/1984  (GB) .
57-137760 *  8/1982  (JP) .
9-133988  *  5/1997  (JP) .

OTHER PUBLICATIONS

Derwent Abstract of Japanese document 9–133988, 1997.*
European Search Report EP 99 10 7378, Aug. 1999 Patent Abstracts of Japan, Publication #09133988, Publication date: May 20, 1997.
Patent Abstracts of Japan, Publication #57137780, Publication date: Aug. 25, 1982.

* cited by examiner

Primary Examiner—Alan A. Mathews
(74) Attorney, Agent, or Firm—Jordon B. Bierman; Bierman, Muserlian and Lucas

(57) ABSTRACT

A film unit is provided with an unexposed film chamber in which an unexposed film is accommodated beforehand; a photographing lens through which the unexposed film is imagewise exposed; a film wind-up chamber; a spool provided in the film wind-up chamber, holding an end portion of the film, and having a rotation center on which the spool is rotated so that the exposed film is wound up into the film wind-up chamber; a spool engaging member for engaging with the spool; and a wind-up operating member located at an eccentric position from the rotation center of the spool and for engaging with the spool engaging member so that the wind-up operating member rotates the spool through the spool engaging member.

15 Claims, 10 Drawing Sheets

FILM UNIT WITH A LENS ATTACHED

BACKGROUND OF THE INVENTION

This invention relates to a film unit with a lens attached (a single use camera) and to a mechanism for winding up operation of a photographic film.

Up to now, a film unit with a lens attached, that is, a simple camera unit which serves to photographing in a condition with a photographic film (hereinafter referred to as 'a film') loaded therein is brought into practice and is widely used owing to its easy operation.

However, if the thickness of the film unit with a lens attached is made small in order to make the unit small-sized, the diameter of the member for winding up operation has necessarily to be small, and the winding up torque to the member for winding up operation becomes heavy according as the diameter becomes small, which detracts much from it for the operational torque to be light.

Further, there has been a problem to be solved that if the thickness of the film unit with a lens attached becomes small, the member for winding up operation sinks down under the operating plane into the inside of the camera body owing to the restriction resulting from the light shielding structure against the external light; hence, a finger of the user touches a part of the camera body adjacent to the member for winding up operation, and a sufficient operational force can not be transmitted to the member for winding up operation accordingly, which detracts much from it for the operational performance to be comfortable.

SUMMARY OF THE INVENTION

This invention was made in view of the above-mentioned situation, and it is an object of it to provide a film unit with a lens attached that has actualized a light operational performance and an excellent light shielding ability while the thickness has been made as small as possible.

Further, it is another object of this invention to provide a mechanism for winding up operation for a photographic film which can be applied to various kinds of cameras other than a film unit with a lens attached. The above-mentioned object can be accomplished by a film unit with a lens attached having a following structure:

A film unit with a lens attached comprising:

an unexposed film chamber for receiving an unexposed film beforehand, a film winding up chamber for receiving a film which has been wound up, a photographing lens, a spool positioned in said film winding up chamber for holding the end portion of the film, a spool-engaged member being engaged with said spool, and a member for winding up operation disposed at an eccentric position with regard to the center of rotation of said spool for being engaged with said spool-engaged member.

Furthermore, the above-mentioned object is also accomplished by any one of following film units with a lens attached having a desirable structure:

(1) A film unit with a lens attached comprising an unexposed film chamber loaded with an unexposed film, a film winding up chamber for winding up a film every time after a photographing shot, and a photographing lens, further comprising a spool-engaged member for being engaged with a spool provided in said film winding up chamber, and a member for winding up operation disposed at an eccentric position deviated to the operational plane side with regard to said spool and gear-combined with said spool-engaged member.

According to this invention, the spool-engaged member and the member for winding up operation disposed at an eccentric position deviated to the operational plane side with regard to the film winding up chamber are gear-combined; hence, it becomes possible to expose the member for winding up operation to the outside of the operational plane while the thickness of the film unit with a lens attached is made as small as possible, and a light operational performance for winding up a film can be actualized.

(2) A film unit with a lens attached comprising an unexposed film chamber loaded with an unexposed film, a film winding up chamber for winding up a film every time after a photographing shot, and a photographing lens, further comprising a spool-engaged member for being engaged with a spool provided in said film winding up chamber, and a member for winding up operation disposed at an eccentric position deviated to the operational plane side with regard to said spool and gear-combined with said spool-engaged member, and on the upper surface of said film winding up chamber, an engaging projecting portion for being engaged with said spool-engaged member and a journal supporting portion positioned at the operational plane side from this engaging projecting portion, wherein the spool-engaged member is positioned on said engaging projecting portion, while a part of the member for winding up operation is disposed in a manner such that said journal supporting portion is positioned between it and said spool-engaged member, and the spool-engaged member and the member for winding up operation are journal-supported in a gear-combined condition.

According to this invention, the spool-engaged member is gear-combined with the member for winding up operation disposed at an eccentric position deviated to the operational plane side with regard to the film winding up chamber; hence, the member for winding up operation is exposed to the outside of the operational plane and can be rotated in a stable condition, while the thickness of the film unit with a lens attached is made as small as possible; thus a light operational performance can be actualized.

(3) A film unit with a lens attached comprising a film winding up chamber to be loaded with a film for winding up the film every time after a photographing shot, and a photographing lens, further comprising a spool-engaged member provided with a gear having external teeth for being engaged with a spool disposed in said film winding up chamber, and a member for winding up operation combined with said spool-engaged member by an internal gear having a larger number of internal teeth than said gear.

According to this invention, the number of teeth of the internal gear of the member for winding up operation is made larger than that of the gear of the spool-engaged member; hence, the spool-engaged member of the member for winding up operation is rotated at an increased speed and a rapid winding operation can be actualized, while the thickness of the film unit is made as small as possible.

(4) A film unit with a lens attached comprising a film winding up chamber to be loaded with a film for winding up the film every time after a photographing shot, and a photographing lens, further comprising a spool-engaged member provided with a gear having internal teeth for being engaged with a spool disposed in said film winding up chamber, and a member for winding up operation disposed at an eccentric position deviated to the operational plane side with regard to said film winding up chamber, said member for winding up operation being combined with said spool-engaged member by a gear having a smaller number of external teeth than that of said gear.

According to this invention, the number of external teeth of the gear of the member for winding up operation is made smaller than that of the internal teeth of the gear of the spool-engaged member; hence, the operational force for the member for winding up operation can be reduced, and a light operational performance for winding up a film can be actualized.

(5) A film unit with a lens attached set forth in any one of the paragraphs (1) to (4), wherein a part of the member for winding up operation and the spool-engaged member form an overlapping portion extending along the direction of rotation of these members.

According to this invention, a part of the member for winding up operation and the spool-engaged member form an overlapping portion extending along the direction of rotation; hence, the light shielding ability against external light for the film winding up chamber can be improved in a compact manner.

(6) A mechanism for winding up operation for a photographic film which is used in a camera provided with a film winding up chamber for winding up a film every time after a photographing shot comprising a spool-engaged member for being engaged with a spool provided in said film winding up chamber, and a member for winding up operation gear-combined with said spool-engaged member.

According to this invention, the structure is made up in a manner such that the member for winding up operation is gear-combined with the spool-engaged member provided in the film winding up chamber; hence, a light operational performance for winding up a film can be actualized simply and with a small number of parts by applying the structure to a camera provided with a film winding up chamber.

DETAILED DESCRIPTION OF THE PREFERRED EMBODIMENT

In the following, the embodiments of this invention will be explained in detail with reference to the drawings.

(Embodiment 1)

Figure 1:
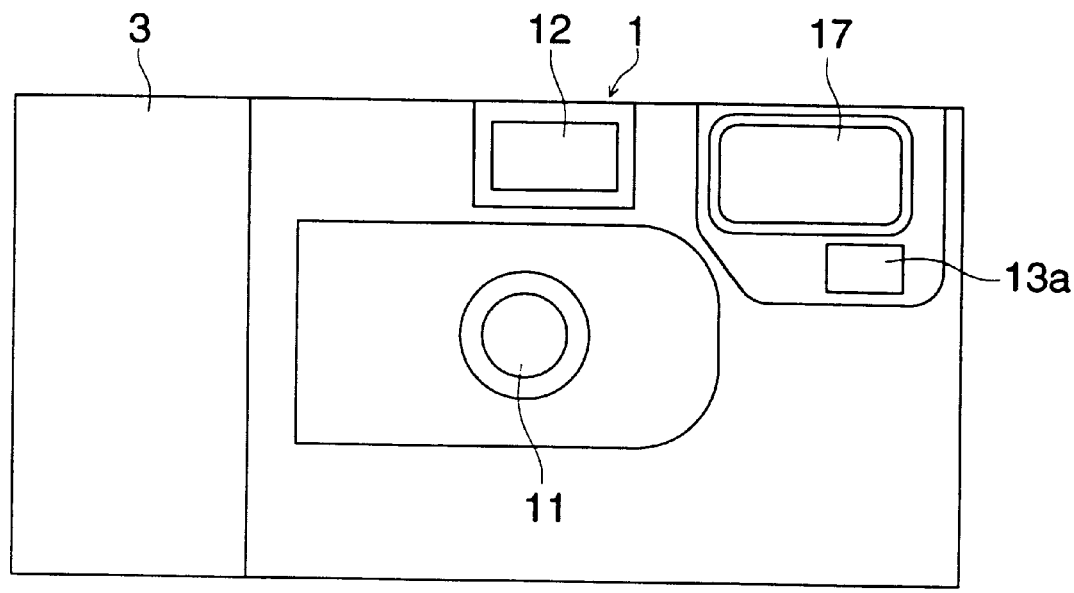
FIG. 1 is the front view of a film unit with a lens attached of the embodiment 1 of this invention.
Figure 2:
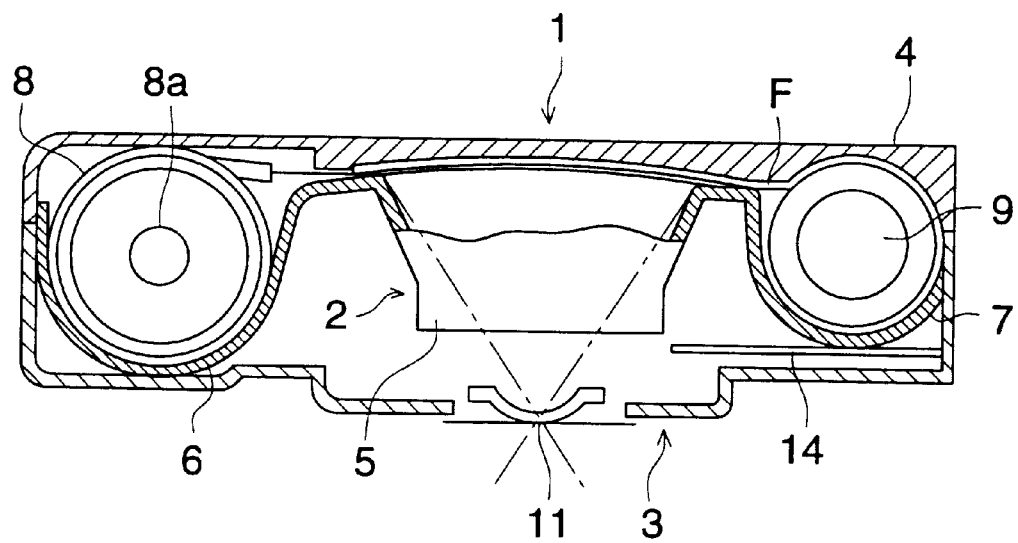
FIG. 2 is a drawing showing the internal structure of a film unit with a lens attached of the embodiment 1 of this invention.
Figure 3:
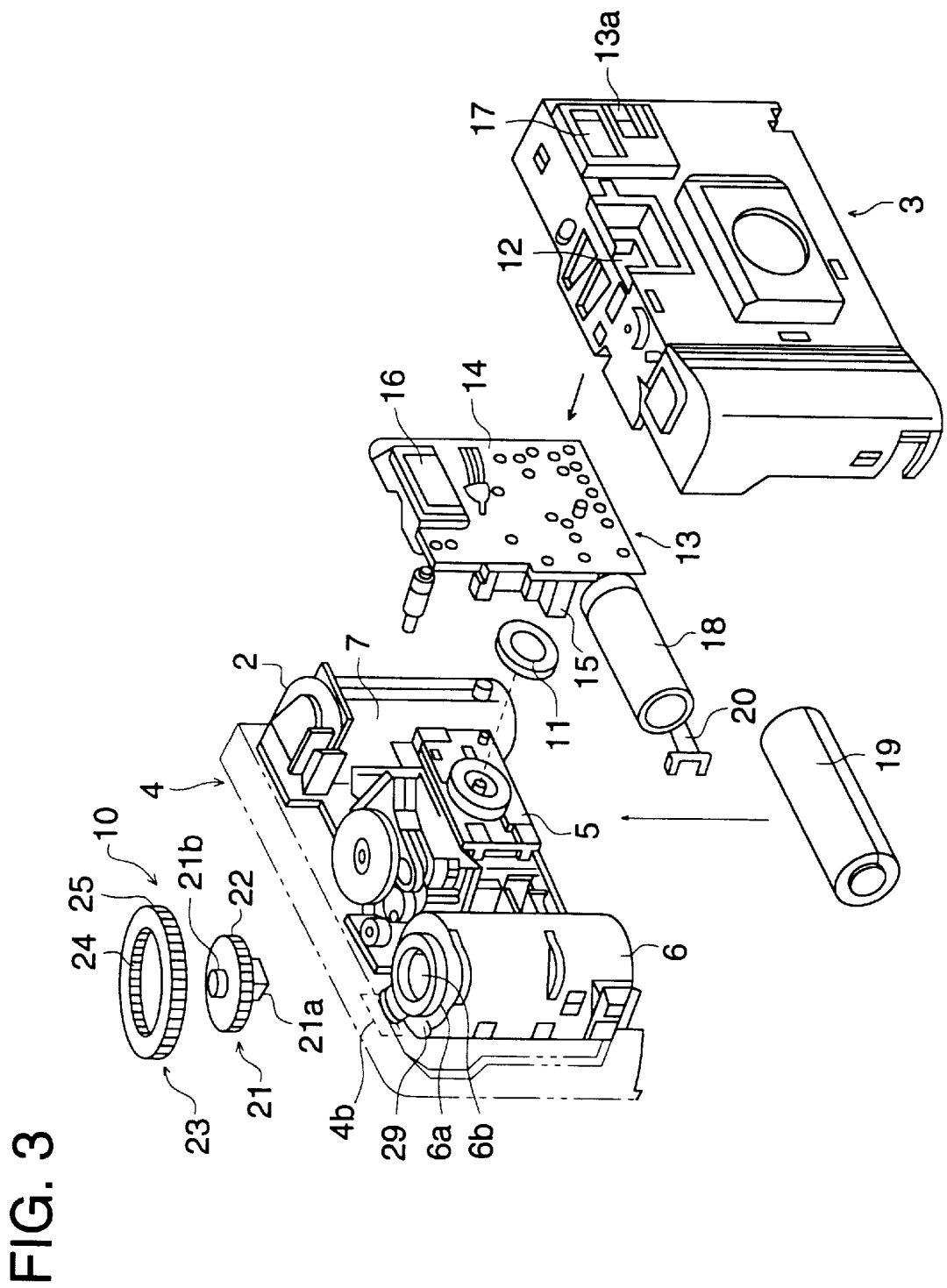
FIG. 3 is an exploded perspective view of a film unit with a lens attached of the embodiment 1 of this invention.

FIG. 1 is the front view of the film unit with a lens attached 1 of this embodiment 1, FIG. 2 is a cross-sectional view illustrating the internal structure of the film unit with a lens attached 1, and FIG. 3 is an exploded perspective view of the film unit with a lens attached 1.

The film unit with a lens attached 1 of this embodiment 1 is a simple camera unit to be used in photographing in a condition loaded with a photographic film F (hereinafter referred to as 'film'), and the film F is loaded in the assembly process of this film unit with a lens attached 1; it is not necessary for a user to do operations such as film loading and rewinding, and he can carry out photographing of a photographic object immediately.

The film unit with a lens attached 1 shown in FIG. 1 to FIG. 3 is made up by fitting the front cover 3 and the rear cover 4 to the camera body 2.

The photographing frame 5 is provided at the center of the camera body 2, and the cartridge chamber 6 is provided in one of the left and right sides of this photographing frame 5, and the unexposed film chamber 7 is provided in the other side of it. As shown in FIG. 2, the cartridge 8 is loaded in the cartridge chamber 6, and the film F wound around the spool 9 is received in the unexposed film chamber 7, and this film F is to be taken up by the cartridge spool 8a in the cartridge chamber 8 by the mechanism for winding up operation 10, the detail of which will be described later, at the time of photographing.

The mechanism for winding up operation 10 is made up of the winding up knob 23, that is, the member for winding up operation operated by a user, and so forth, and disposed over the cartridge chamber 6; further, the photographing lens 11 is provided in the front side of the photographing frame 5. The viewfinder 12 mounted on the front cover 3 is disposed at the upper portion of the photographing frame 5.

Further, the film unit with a lens attached 1 is provided with the strobe light unit 13. The strobe base board 14 of the strobe light unit 13 is fitted to the front side of the unexposed film chamber 7. The circuit elements 15 are arranged on the strobe base board 14, and further to the upper position of the board, the light emitting portion 16 is connected, and this light emitting portion 16 faces the strobe light emitting window 17 provided in the front cover 3.

Further, the main capacitor 18 is connected to the lower position of the strobe base board 14, and the power source battery 19 is connected to the strobe base board through the lead plate 20.

Thus, the light emitting portion 16 is made to emit light by the voltage of the electricity charged in the main capacitor 18 by the power source battery 19.

Under the strobe light emitting window 17, there is provided the knob 13a as the strobe switch, and at the time of strobe photographing, charging operation to the main capacitor 18 is carried out by handling this knob 13a in order to make the strobe light unit emit light in synchronism with the exposure for the film F.

In the following, the mechanism for winding up operation 10 in the film unit with a lens attached 1 of this embodiment 1 will be explained with reference to FIG. 4 to FIG. 6.

According to this invention, when a user rotates the member for winding up operation disposed at an eccentric position with respect to the center of rotation of the spool, the spool-engaged member engaged with the member for winding up operation rotates, making the spool disposed in the film cartridge or in the 'Patrone' in the film winding up chamber rotate to wind up the film.

Incidentally, the member for winding up operation may be disposed, with respect to the center of rotation of the spool, at an eccentric position deviated to the direction of the rear surface of the film unit with a lens attached, to the direction of the front surface, to the direction of the side surface near the member for winding up operation, or to the direction of the lens reverse to said side surface; however, it is desirable to dispose it at an eccentric position deviated to the operational plane side.

The word 'operational plane' in the above-mentioned operational plane side means the plane where a user can handle the member for winding up operation a part of which is exposed to the outside of the film unit with a lens attached. If the member for winding up operation is exposed to outside the rear surface of the film unit with a lens attached, it means the rear surface of the film unit with a lens attached, and if the member for winding up operation is exposed to outside the side surface of the film unit with a lens attached, it means the side surface of the film unit with a lens attached.

In this embodiment, the engaging projecting portion 6a, which has a circular shape and projects upward, is formed around the engaging hole 6b positioned above the cartridge chamber 6 of the camera body 2, and the journal supporting portion 29, which projects upward and has a shape of a crescent, is formed at a position to the rear side (the side of the rear cover 4) of said camera body 2 from the engaging projecting portion 6a. Further, in said engaging hole 6a, there is provided the engaging piece 21a for being combined with the cartridge spool 8a, and there is inserted also the engaging piece 21a of the spool-engaged member 21 with an approximately circular plate shape, which has a diameter smaller than the outer circumference of the cartridge chamber 6, has a gear 22 (an external tooth gear with the number of teeth N1) formed along the whole outer circumference, and is provided with a circular projecting piece 21b at the central portion of the upper surface.

The gear 22 of this spool-engaged member 21 is engaged with the internal gear 24 (the number of teeth N2, N1<N2) of the ring-shaped winding up knob 23, the member for winding up operation, which has the internal gear 24 formed on its inner circumference and is provided with the turret-like grooves 25 on its whole outer circumference.

Figure 5:
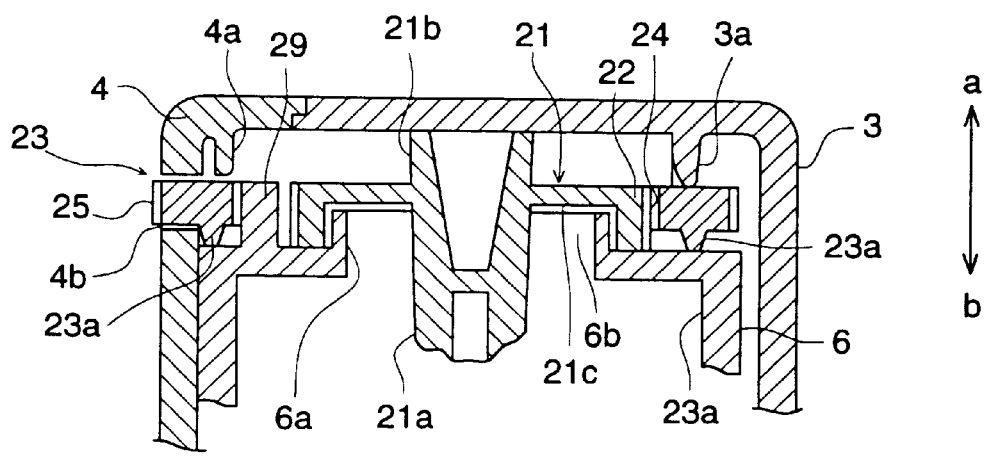
FIG. 5 is a partial cross-sectional view showing an example of the mechanism for winding up operation of the embodiment 1 of this invention.

As shown in FIG. 5, the circular hollow portion 21c is formed on the lower surface side of the aforesaid spool-engaged member 21, and the diameter of this hollow portion 21c is determined to be slightly larger than the outer circumference of the aforesaid engaging projecting portion 6a.

Further, as shown in FIG. 5, the circular rib 23a is provided on the lower surface side of the aforesaid winding up knob 23.

Thus, as shown in FIG. 5, the spool-engaged member 21 is supported in a rotatable way on the aforesaid engaging projecting portion 6a in a manner such that a part of its outer circumference is positioned inside the aforesaid crescent-shaped journal supporting portion 29, while the winding up knob 23 that is gear-combined with this spool-engaged member 21 is supported in a way capable of rotating at the outside of the spool-engaged member 21 in a manner such that a part of its inner circumference is positioned outside the aforesaid crescent-shaped journal supporting portion 29.

The position of the spool-engaged member 21 is regulated for its up-and-downward direction by contacting the aforesaid circular projecting piece 21b with the upper inner surface of the front cover 3, and the position of the winding up knob 23 is regulated for its up-and-downward direction by contacting its upper surface with the front cover 3 and the hanging ribs 3a and 4a and further by contacting the aforesaid circular rib 23a with the upper surface of the cartridge chamber 6.

In other words, this mechanism for winding up operation 10 is designed to make the winding up of the film F by means of the mechanism made up of the winding up knob 23 and the spool-engaged member 21 gear-combined with each other, the centers of both being positioned mutually eccentrically (the winding up knob 23 deviated to the rear cover 4 side). In addition, the direction of the deviation of the winding up knob 23 may be, if the diameter is large, the optical axis side of the photographing lens 11 as far as it does not project to the front cover 3 side.

By disposing the aforesaid winding up knob 23 in this manner, a part of this winding up knob 23, as shown in FIG. 5, projects outside out of the through hole 4b for the winding up knob 23 provided in the rear cover 4, and owing to this, a user can carry out the winding up of the film F with a good operational performance by handling this winding up knob 23 with his finger easily to rotate it.

Further, according to this mechanism for winding up operation 10, the relationship between the number of the teeth N1 of the gear 22 of the spool-engaged member 21 and the number of the teeth N2 of the internally touching gear 24 of the winding up knob 23 is made to be N1<N2; hence, the winding up of the film F can be carried out at an increased speed of rotation transmitted from the winding up knob 23 to the spool-engaged member 21. Owing to this, it has an effect that a rapid winding up of the film F can be actually done.

Furthermore, owing to the structure for making the winding up knob 23 to be at an eccentric position, which is divided into the spool-engaged member 21 and the winding up knob 23, it becomes unnecessary to have the cartridge spool subjected to a special processing, and the film unit with a lens attached 1 can be provided at a low cost.

Figure 6:
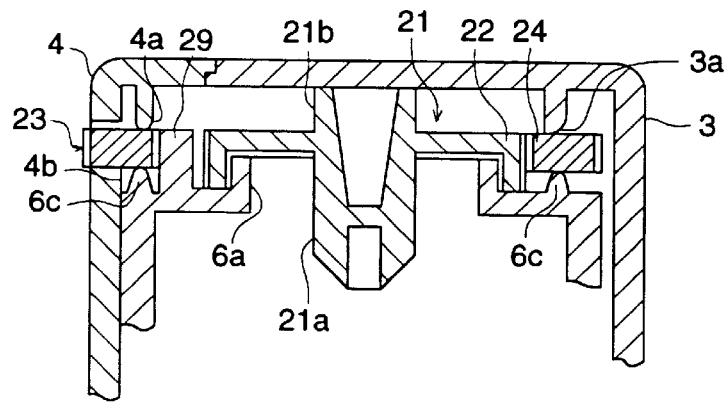
FIG. 6 is a partial cross-sectional view showing another example of the mechanism for winding up operation of the embodiment 1 of this invention.

In addition, as shown in FIG. 6, it may be appropriate to carry out the positional regulation of the winding up knob 23 in the up-and-downward direction by contacting, instead of the circular rib 23a of the winding up knob 23, the cartridge chamber side rib 6c provided on the upper surface of the cartridge chamber 6 with the lower surface of the winding up knob 23.

(Embodiment 2)

In the following, the mechanism for winding up operation 30 of the embodiment 2 of this invention will be explained with reference to FIG. 7.

Figure 4:
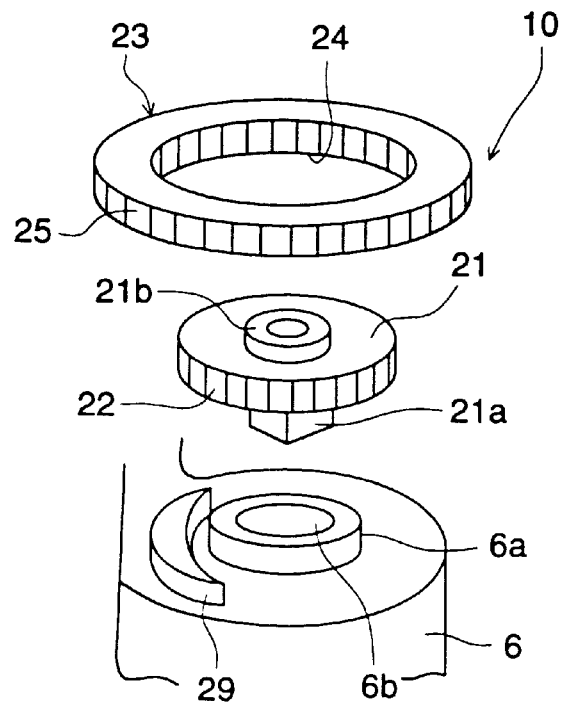
FIG. 4 is an exploded perspective view showing an example of the mechanism for winding up operation of the embodiment 1 of this invention.
Figure 7:
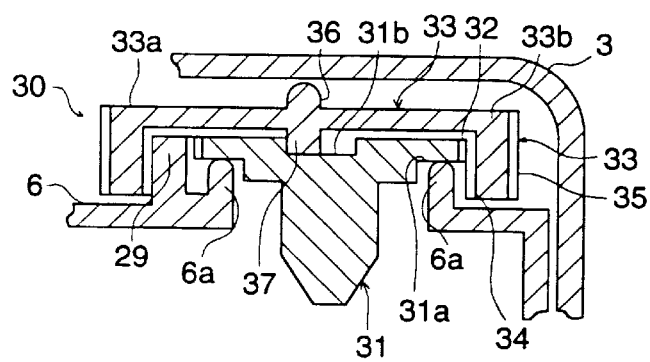
FIG. 7 is a partial cross-sectional view showing an example of the mechanism for winding up operation of the embodiment 2 of this invention.

Incidentally, in the mechanism for winding up operation 30 shown in FIG. 7, the same structure components as those in the mechanism for winding up operation 10 of the embodiment 1 shown in FIG. 4 to FIG. 6 are indicated with the same signs attached.

The mechanism for winding up operation 30 shown in FIG. 7 employs a structure which is basically similar to that of the mechanism for winding up operation 10 of the embodiment 1, however, it is characterized by it that the respective shapes of the spool-engaged member 31 and the winding up knob 33 are modified, while the structure of the cartridge chamber 6 side is the same as that in the case of the mechanism for winding up operation 10 of the embodiment 1.

To state it concretely, while the spool-engaged member 31 in the mechanism for winding up operation 30 of the embodiment 2 has a smaller diameter than the outer circumference of the cartridge chamber 6 and is provided with the gear 32 (external tooth gear with the number of teeth N1) on its whole outer circumference, it is also provided with, as shown in FIG. 7, the circular step portion 31a that makes contact with the upper surface of the engaging projecting portion 6a of said cartridge chamber 6, and further, it is provided with the circular hollow portion 31b in the central portion of the upper surface.

Further, the winding up knob 33 is provided with the internal gear 34 (the number of teeth N2, N1<N2), which is engaged with the gear 32 of the spool-engaged member 31, on the inner circumference of the rim portion 33b provided at the whole outer circumference of the disk-shaped base portion 33a, and the turret-like grooves 35 are provided on the whole outer circumference of the rim portion 33b; as a whole, the winding up knob is formed in a shape like a circular plate.

Furthermore, the upper side projecting portion 36 is provided in the central portion of the upper surface of the disk-shaped base portion 33a, and the lower side projecting portion 37 is provided in the central portion of its lower surface; the upper side projecting portion 36 is made to contact with the lower surface of the upper portion of the front cover 3, and the lower side projecting portion 37 is made to contact with the aforesaid circular hollow portion 31b of the spool-engaged member 31, in order that the position of the mechanism for winding up operation 30 may be regulated in the up-and-downward direction.

As in the case of the embodiment 1, according to also this mechanism for winding up operation 30 of the embodiment 2, the winding up of the film F can be carried out at an increased speed of rotation transmitted from the winding up knob 33 to the spool-engaged member 31. Owing to this, it has an effect that a rapid winding up of the film F can be actually done.

Figure 8:
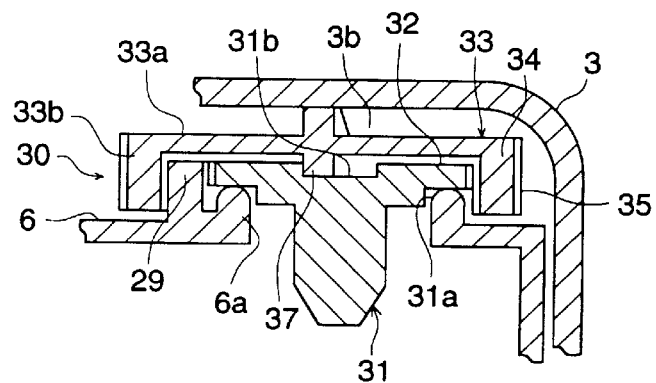
FIG. 8 is a partial cross-sectional view showing another example of the mechanism for winding up operation of the embodiment 2 of this invention.

In addition, as shown in FIG. 8, by providing the cover side rib 3b, which makes contact with the upper surface of the aforesaid winding up knob 33, on the lower surface of the upper portion of the front cover 3, an unintentional movement of the winding up knob 33 at the time of rotating it can be eliminated, which improves the stability of rotating operation.

(Embodiment 3)

In the following, the mechanism for winding up operation 40 of the embodiment 3 of this invention will be explained with reference to FIG. 9 and FIG. 10.

Figure 9:
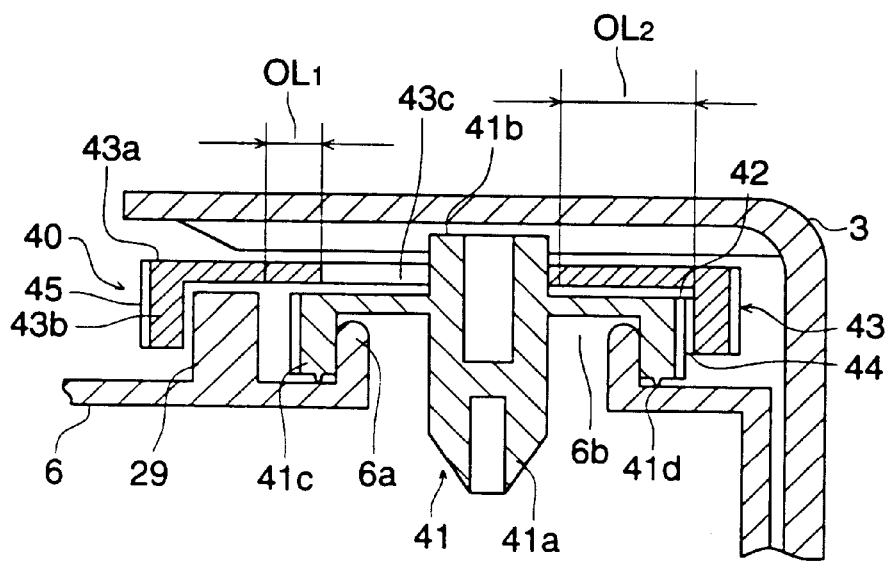
FIG. 9 is a partial cross-sectional view showing the mechanism for winding up operation of the embodiment 3 of this invention.
Figure 10:
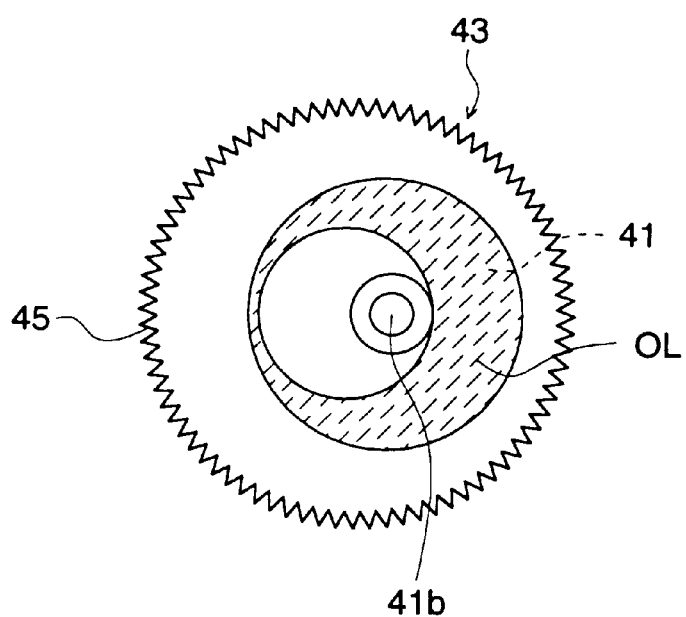
FIG. 10 is an illustration showing the spool-engaged member and the winding up knob of the mechanism for winding up operation of the embodiment 3 of this invention.

Incidentally, in the mechanism for winding up operation 40 shown in FIG. 9 and FIG. 10, the same structure components as those in the mechanism for winding up operation 10 of the embodiment 1 shown in FIG. 4 to FIG. 6 are indicated with the same signs attached.

The mechanism for winding up operation 40 shown in FIG. 9 and FIG. 10 employs a structure which is basically similar to that of the mechanism for winding up operation 10 of the embodiment 1, however, it is characterized by it that the respective shapes of the spool-engaged member 41 and the winding up knob 43 are modified, while the structure of the cartridge chamber 6 side is the same as that in the case of the mechanism for winding up operation 10 of the embodiment 1.

To state it concretely, while the spool-engaged member 41 of the mechanism for winding up operation 40 of the embodiment 3 is provided with the engaging portion 41a to be inserted into the aforesaid engaging hole 6b, which is formed in the aforesaid engaging projecting portion 6a, it is also provided with the gear 42 (an external tooth gear with the number of teeth N1) on the whole outer circumference of the rim portion 41c having a smaller diameter than the outer circumference of the cartridge chamber 6, and with the circular projecting portion 41b in the central portion of the upper surface. Further, on the projecting edge surface of the rim portion 41c of the spool-engaged member 41, there is provided the circular contacting projecting piece 41d, which makes contact with the upper surface of said cartridge chamber 6.

Further, the winding up knob 43 is provided with the internal gear 44 (the number of teeth N2, N1<N2), which is engaged with the gear 42 of the spool-engaged member 41, on the inner circumference of the rim portion 43b provided at the whole outer circumference of the disk-shaped base portion 43a, which is shaped like a circular plate and has the central hole 43c, and the turret-like grooves 45 are provided on the whole outer circumference of the rim portion 43b; as a whole, the winding up knob 43 is formed in a shape like a circular plate.

Thus, as shown in FIG. 9, the spool-engaged member 41 is supported in a way capable of rotating on the aforesaid engaging projecting portion 6a in a manner such that a part of its outer circumference is positioned inside the aforesaid crescent-shaped journal supporting portion 29, while the winding up knob 43 that is gear-combined with this spool-engaged member 41 is supported in a way capable of rotating at the outside of the spool-engaged member 41 in a manner such that a part of its inner circumference is positioned outside the aforesaid crescent-shaped journal supporting portion 29. Further, the circular projecting portion 41b of the spool-engaged member 41 is made to pass through the aforesaid central hole 43c of the winding up knob 43 to contact with the lower surface of the upper portion of the front cover 3, so that the position of this mechanism for winding up operation 40 may be regulated in the up-and-downward direction.

As in the case of the embodiment 1, according to also this mechanism for winding up operation 40 of the embodiment 3, the winding up of the film F can be carried out at an increased speed of rotation transmitted from the winding up knob 43 to the spool-engaged member 41. Owing to this, it has an effect that a rapid winding up of the film F can be actually done.

Further, as shown in FIG. 9 and FIG. 10, owing to the above-mentioned combined structure made up of the aforesaid winding up knob 43 and the spool-engaged member 41, the overlapping area OL, that is, from OL1 at the minimum to OL2 at the maximum, is produced between the disk-shaped base portion 43a of the winding up knob 43 and the spool-engaged member 41; hence, the light shielding ability of the cartridge chamber 6 against the external light is improved in this mechanism for winding up operation 40.

(Embodiment 4)

In the following, the mechanism for winding up operation 50 of the embodiment 4 of this invention will be explained with reference to FIG. 11.

Figure 11:
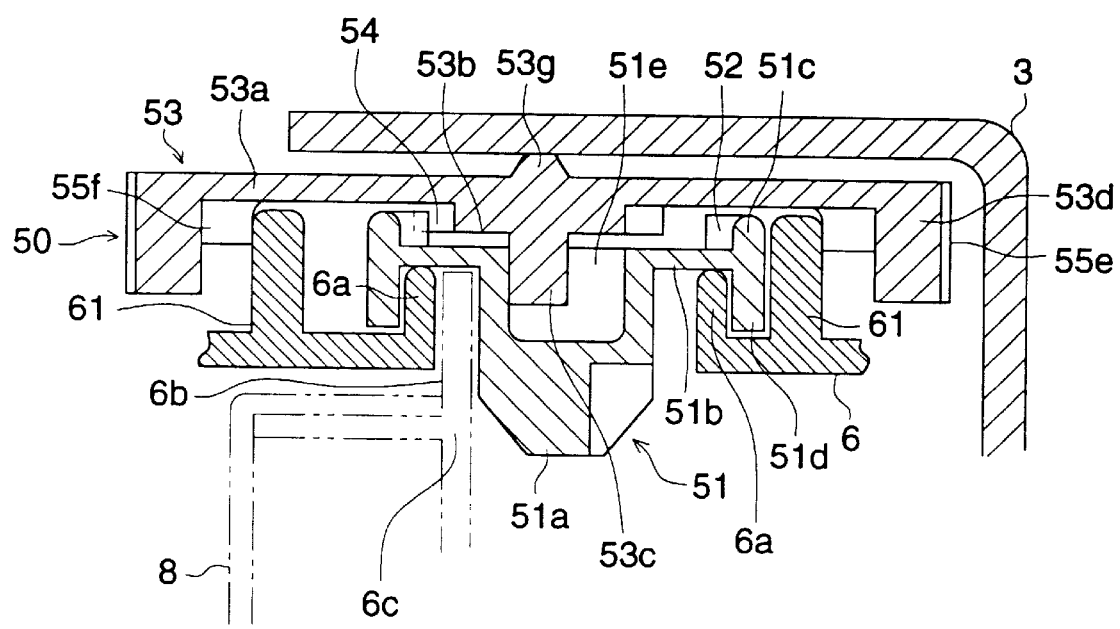
FIG. 11 is a partial cross-sectional view showing the mechanism for winding up operation of the embodiment 4 of this invention.

Incidentally, in the mechanism for winding up operation 50 shown in FIG. 11, the same structure components as those in the mechanism for winding up operation 10 of the embodiment 1 shown in FIG. 4 to FIG. 6 are indicated with the same signs attached.

The mechanism for winding up operation 50 shown in FIG. 11 is provided with the circular engaging projecting portion 6a on the upper surface of the cartridge chamber 6 to project out of it, and also with the circular journal supporting portion 61 for supporting the winding up knob 53 in a way capable of rotating, which is disposed at an eccentric position deviated to the side of the rear cover 4 from this engaging projecting portion 6a to project out of the rear cover 4.

Further, the spool-engaged member 51 is provided with the engaging portion 51a, which is inserted into the engaging hole 6b formed in the aforesaid engaging projecting portion 6a and engaged with the cartridge spool 6c and also with the circular base portion 51b having the circular rim portion 51c which has a diameter smaller than the outer circumference of the cartridge chamber 6, while the gear 52 (an internal tooth gear with the number of teeth N3) is provided on the whole inner circumference of the upper part of the rim portion 51c, and on the inner circumference of the lower part of the rim portion 51c, there is provided the lower side hollow portion 51d, which is engaged with the outer circumference of said engaging projecting portion 6a of the cartridge chamber 6, so that the spool-engaged member 51 may be supported in a manner capable of rotating. Further, in the central portion of the upper surface of the base portion of the spool-engaged member 51, the circular groove portion 51e is formed.

The winding up knob 53 is provided with the internal gear 54 (the number of teeth N4, N3>N4), which is engaged with the gear 52 of the spool-engaged member 51, on the outer circumference of the circular projecting portion 53b on the lower surface side of the disk-shaped base portion 53a. Further, the bar-shaped projecting portion 53c extending downward into the aforesaid circular groove portion 51e of the spool-engaged member 51 is provided in the central portion of the circular projecting portion 53b. Furthermore, on the outer circumference of the disk-shaped base portion 53a, there is provided the rim portion 53d, and on the whole outer circumference of this rim portion 53d, there are provided the turret-like grooves 55e, while on the whole inner circumference of the rim portion 53d, there are provided inner peripheral ribs 55f radiately.

Further, the central projecting portion 53g, which makes contact with the lower surface of the upper portion of the front cover 3, is provided at the center of the upper surface of the disk-shaped base portion 53a of the winding up knob 53, in order that it may regulate the position of the mechanism for winding up operation 50 in the up-and-downward direction.

This winding up knob 53 is subjected to a rotary operation in a condition that the inner peripheral ribs 55f is contacted with the journal supporting portion 61 and the internal gear 54 is engaged with the aforesaid gear 52.

According to this mechanism for winding up operation 50, the winding up of the film F is carried out by transmitting the rotary operation force given to the winding up knob 53 to the gear 52 of the spool-engaged member 51 having a larger number of teeth through the internal gear 54 having a smaller number of teeth; hence, it has an effect that the winding up of the film F can be actually done with a light operational force by reducing the speed of the spool-engaged member 51.

(Embodiment 5)

Figure 12:
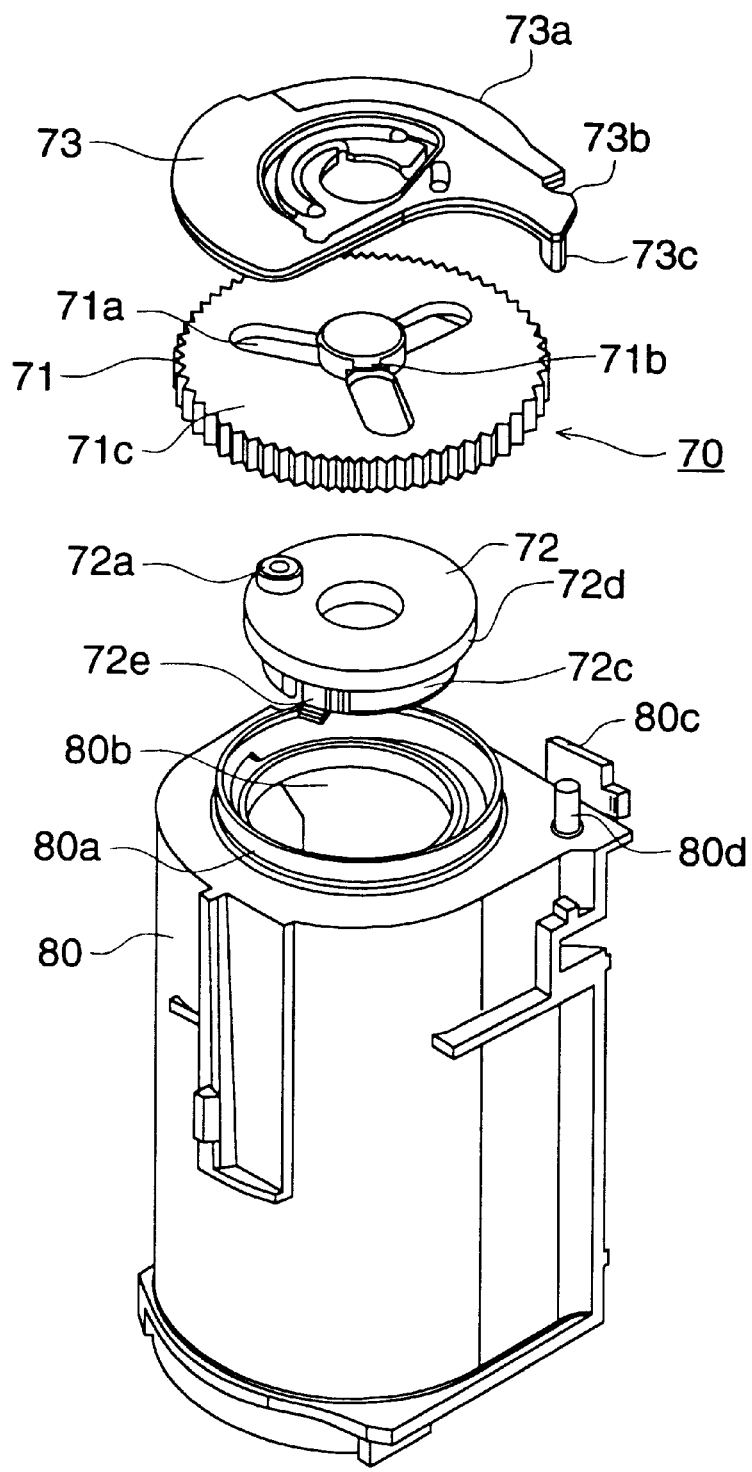
FIG. 12 shows an overhauled perspective view showing a wind-up operating mechanism in embodiment 5 of the present invention.
Figure 13:
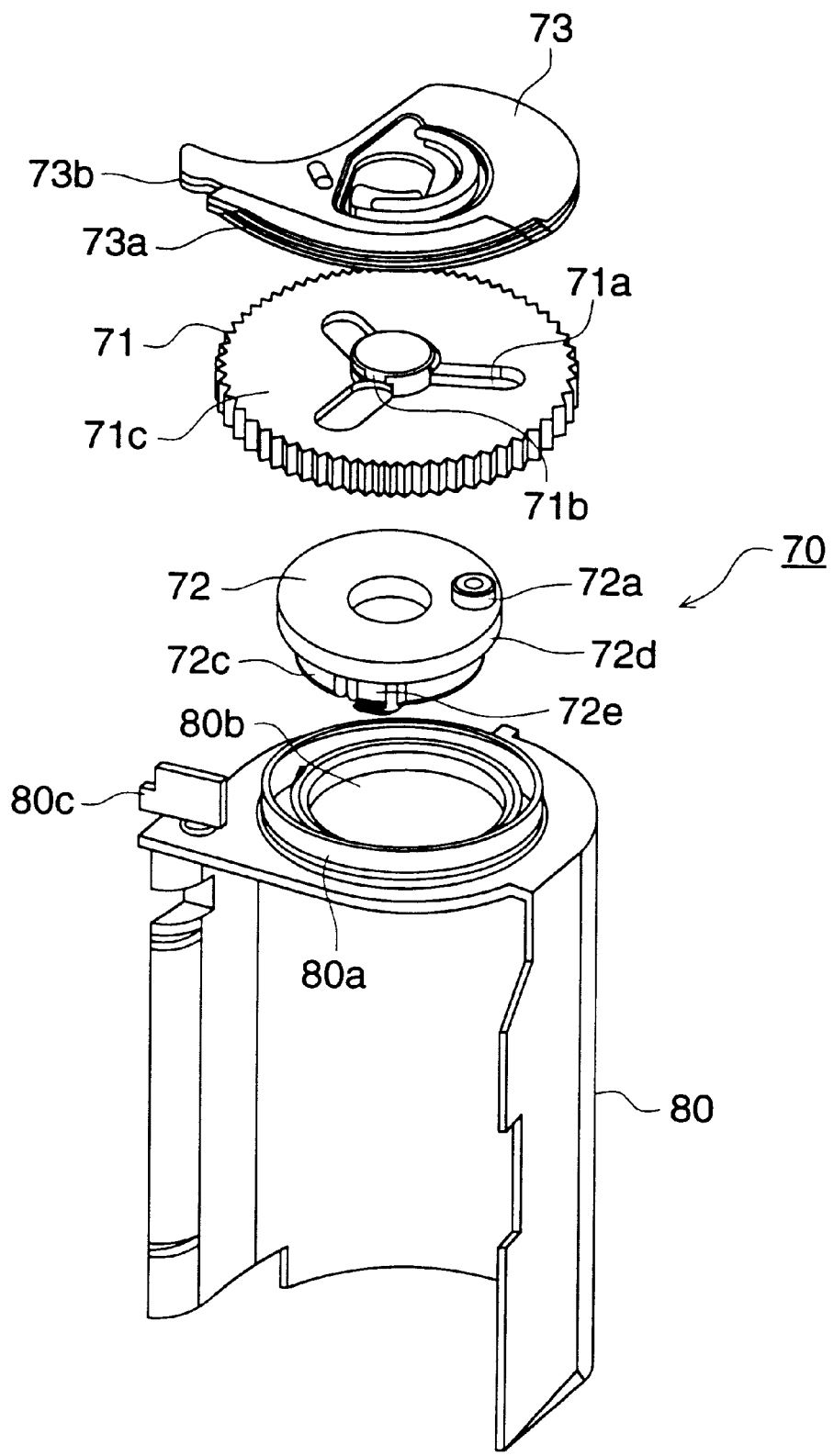
FIG. 13 shows respectively an overhauled perspective view showing a wind-up operating mechanism in embodiment 5 of the present invention.
Figure 14:
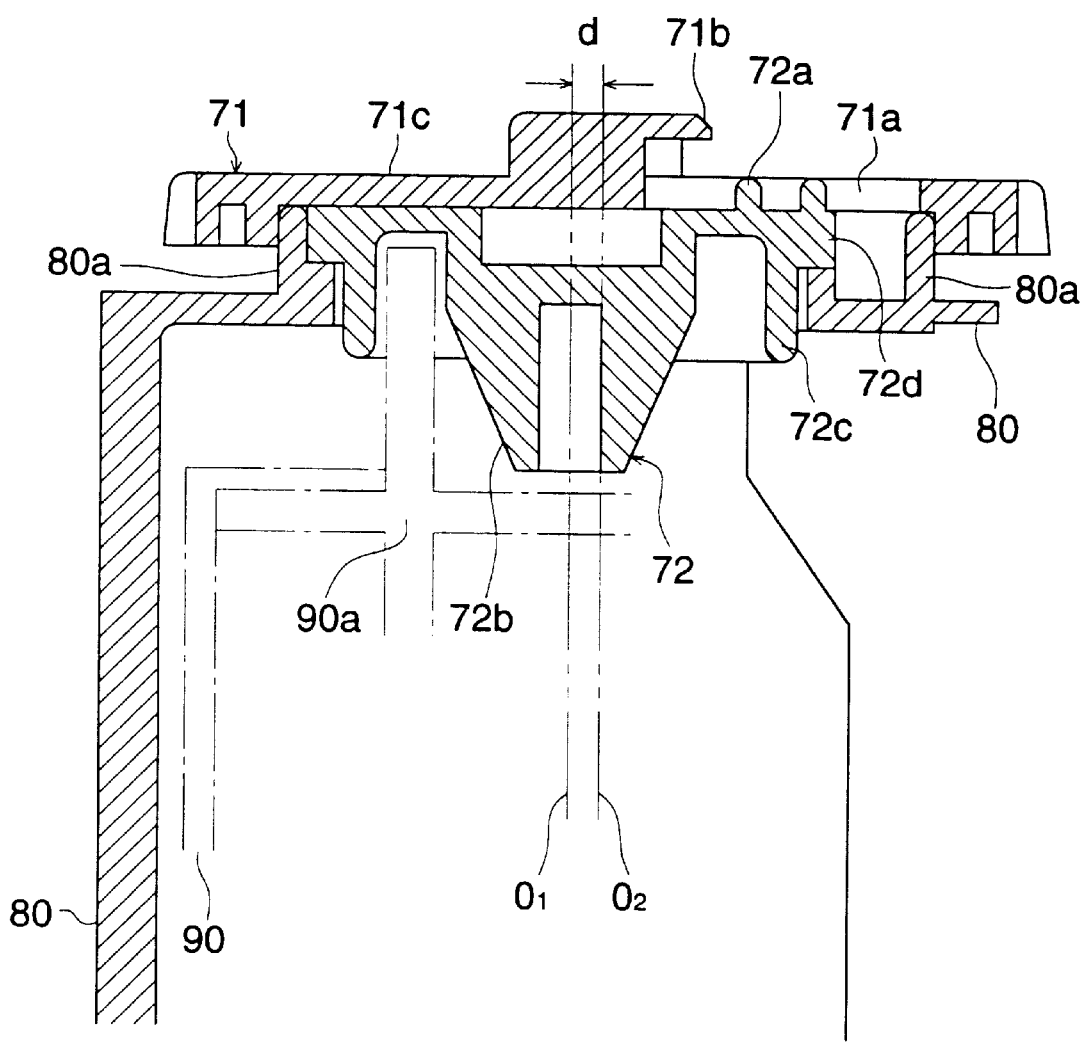
FIG. 14 shows a partial sectional view showing the wind-up operating mechanism in embodiment 5 of the present invention.
Figure 15:
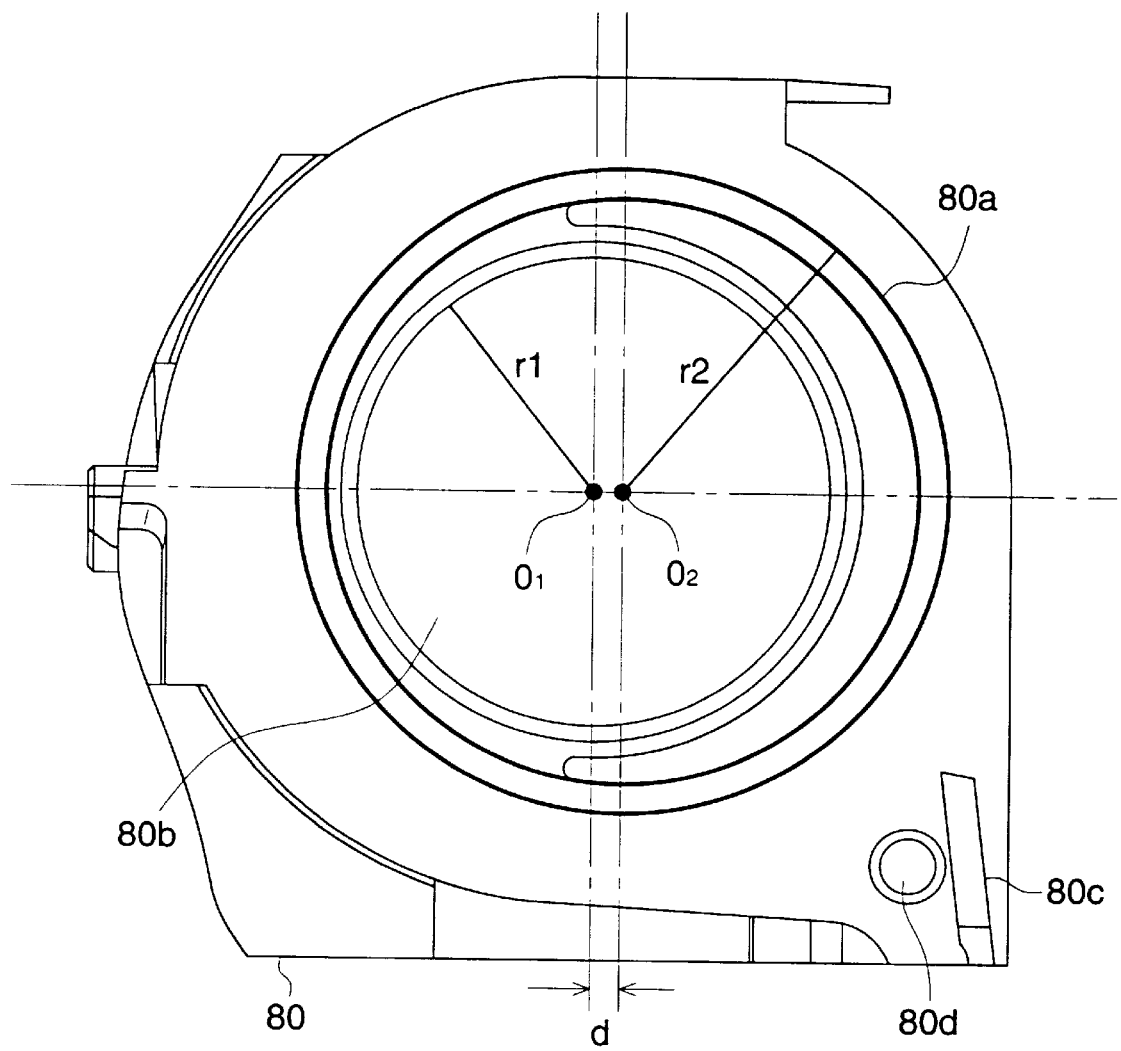
FIG. 15 is a plan view showing a cartridge room of the main body on which the wind-up operating mechanism in embodiment 5 of the present invention is provided.

FIG. 12 and FIG. 13 show respectively an overhauled perspective view showing a wind-up operating mechanism in embodiment 5 of the present invention. FIG. 14 shows a partial sectional view showing the wind-up operating mechanism in embodiment 5 of the present invention. FIG. 15 is a plan view showing a cartridge room of the main body on which the wind-up operating mechanism in embodiment 5 of the present invention is provided. In FIGS. 12, 13, 14 and the wind-up operating mechanism 70 in embodiment 5 of the present invention 15 provided at a upper section of a film wind-up room 80 comprises a wind-up knob 70 used as a wind-up operating member for film F, a spool engaging member 72 used as a rotation transmitting member for engaging with a wind-up shaft (spool shaft), and a releasing member 73 for releasing the reverse rotation prevention for the wind-up knob.

Here, an engaging hole 80b is provided at an upper section of the wind-up room 80 and an engaging protruding section 80a protruding upwardly is provided around the engaging hole 80b. Further, a reverse rotation preventing claw 80c to prevent the reverse rotation of the wind-up knob 71 is provided at the position located closer to a back cover 4 (an operation side) than to the engaging protruding section 80a on the wind-up operating mechanism.

As shown in FIG. 15, the engaging hole 80b is a hole having a center o1 and a radius r1. A cylinder section 72c is formed around an engaging piece 72b of a spool engaging member 72 for engaging with a spool 90a in the cartridge 90 and inserted into the engaging hole 80b. The engaging hole 80b is enclosed so as to be on a light shielding condition by the cylinder section 72c and a flange section 72d of the spool engaging member 72. Accordingly, the inside of the film wind-up room 80 is shielded from light by the spool engaging member 72. Here, the center o1 is further used the center of rotation of the spool 90a.

As shown in FIG. 15, the engaging protruding section 80a is formed by a cylindrical rib having a radius r2 and a center o2 which is eccentric from the center o1 of the engaging hole 80b to the operation side by an eccentric distance d. The engaging protruding section 80a engages with a concave section formed on a lower surface of the wind-up knob 71 and supports the wind-up knob so as to be rotatable. Here, the center o2 is further used the center of rotation of the wind-up operating member.

In the spool engaging member 72, a column-shaped protrusion 72a to engage with the wind-up knob 71 is formed on an upper surface of the spool engaging member 72 and a hooking claw 72e to hook the spool engaging member 72 on the engaging hole 80b is formed on a lower surface of the spool engaging member 72 by providing a cut-out section at a part of the cylinder section 72c. The hooking claw 72e is located at a position distant from the formed position of the protruding 72a, for example, at the position distant by 90 degrees in angle, whereby light is prevented from penetrating into the inside of the film wind-up room 80.

On the wind-up knob 71 arranged at a position eccentric from the spool engaging member 72 is formed a plurality of elongated hole-shaped engaging holes 71a (three engaging holes 71a in the present embodiment) which can rotatably engage with a protrusion 72a of the spool engaging member 72. Accordingly, the wind-up knob 71 and the spool engaging member 72 can be rotated while the eccentric relation between them is absorbed by the engagement between the protrusion 72a and the engaging hole 71a. Here, the protrusion 72a is engaged with one of the plurality of engaging holes 71a. Incidentally, instead of the elongated hole-shaped engaging hole, a groove section such as a depression section may be provided to the wind-up knob. Also, a protrusion may be provided to the wind-up knob and a hole section or a depression section may be provided to a spool engaging member.

Further, a hooking section 71b to hook the releasing member 73 is formed at a center section of the wind-up knob 71. In connection with the hooking section 71b, an end section of the engaging hole 71a is extended to a lower position of the hooking section 71b, whereby the hooking section is formed by only the shift of a manufacturing mold in the upward or downward direction of the wind-up knob 71 without making the structure of the manufacturing mold complicate. Further, by hooking the releasing member 73 on the hooking section 71b, the leasing member 73 overlaps in terms of the thickness with the engaging hole 71a, whereby light is prevented from penetrating inside.

Here, the shape of the engaging hole is not limited to the elongated hole. Further, the engagement between the spool engaging member 72 and the protrusion 72a is not limited to provide the engaging hole 71a. For example, it may be also possible to provide the groove and the rib.

An upper surface 71c of the wind-up knob 71 at the releasing member side (the sliding surface between the wind-up knob 71 and the releasing member 73) is applied with rough surface roughing treatment. This treatment makes the wind-up knob 71 and the releasing member 73 slide smoothly, whereby the load at time of winding up film can be reduced.

On the releasing member is formed a finger operating section 73a on which finger contacts when a user winds up the wind-up knob 71. The finger operating section 73a is shaped in the form of steps in order to reduce the contact area with the user's finger and to make it more slidable. When the releasing member 73 is rotated with the rotating operation for the wind-up knob 71, the releasing member 73 is pressed toward a releasing section 73b, whereby the reverse rotation preventing claw 80c which contacts a saw tooth section formed around the wind-up knob 71 so as to prevent the reverse rotation of the wind-up knob 71 is separated from the wind-up knob 71 and the action of the reverse rotation prevention by the reverse rotation preventing claw 80c is released. At the same time, a stopper section 73c engages with a pin 80d at the releasing position for the reverse rotation preventing action of the reverse rotation preventing claw 80c, whereby the further rotation of the releasing member 73 is prevented. Accordingly, the user's finger can rotate the wind-up knob 71 while sliding the finger operating section 73a.

With the wind-up operating mechanism constructed as described above, the wind-up operating member can be made to have a larger diameter by the eccentric distance, whereby a power necessary for the wind-up operation can be reduced in accordance with the larger diameter. Further, by arranging the operating section operated by a user so as to become closer to the operating surface side, since the operating section is protruded from the main body of the film unit, the contact feeling by finger with the operating section becomes nice and the operating feeling by a user can be enhanced.

In addition, the respective mechanisms for winding up operation of the embodiments 1 through 4 described in the foregoing can be applied, in addition to a film unit with a lens attached, in the same way to a camera that is made up in a manner such that the film F is extracted from a cartridge and the exposed film F is taken up in a film chamber. In the present invention, when the spool engaging member to engage with the spool has a diameter determined within a range indicated below in order to shelter the hole at the top of the cartridge room (the film wind-up chamber), the effect of the present invention becomes more appreciable. In the case of APS-type film cartridge,, the diameter is 7.8 mm to 24 mm. In the case of 135-type film cartridge, the diameter is 16 mm to 26 mm. Although it may be preferable to set the diameter within the above range, the diameter may be set larger than the above range.

Effect of the Invention

According to the invention set forth in the aforesaid paragraph (1), it becomes possible to expose the member for winding up operation to the outside of the operational plane while the thickness of the film unit with a lens attached is made as small as possible; thus it is possible to provide a film unit with a lens attached which can actualize light operational performance for winding up a film.

According to the invention set forth in the aforesaid paragraph (2), the member for winding up operation is exposed to the outside of the operational plane and can be rotated in a stable condition, while the thickness of the film unit with a lens attached is made as small as possible; thus it is possible to provide a film unit with a lens attached which can carry out the winding up of a film rapidly.

According to the invention set forth in the aforesaid paragraph (3), it is possible to provide a film unit with a lens attached which can make it possible not only to keep the operational performance of the member for winding up operation good but also to wind up a film rapidly, while its thickness is made as small as possible.

According to the invention set forth in the aforesaid paragraph (4), it is possible to provide a film unit with a lens attached, wherein the spool-engaged member is rotated at a reduced speed by the operation of the member for winding up operation and it can be performed to wind up a film with a light torque.

According to the invention set forth in the aforesaid paragraph (5), it is possible to provide a film unit with a lens attached which can make it possible to improve the light shielding ability of the cartridge chamber against external light.

According to the invention set forth in the aforesaid paragraph (6), it is possible to provide a mechanism for winding up operation for a photographic film, which can be applied to a camera provided with a cartridge chamber and actualize a light operational performance for winding up a film.

Disclosed embodiments can be varied by a skilled person without departing from the spirit and scope of the invention.

What is claimed is:

1. A film unit provided with a photographic lens, comprising:
   an unexposed film chamber in which an unexposed film is accommodated;
   the photographing lens through which the unexposed film is imagewise exposed;
   a film wind-up chamber in which a film cartridge having a rotatable spool therein is detachably accommodated, wherein the film wind-up chamber comprises a ceiling plate having an engaging hole;

the rotatable spool holding an end portion of the film and having a rotation center on which the spool is rotated so that the exposed film is wound up into the film cartridge;

a spool engaging member on the ceiling plate, having a rotation center coaxial with the rotation center of the spool, and comprising an engaging piece and a first eccentric engagement member, the engaging piece adapted to detachably coaxially engage the spool through the hole of the ceiling plate;

a spool engaging member guide to maintain the rotation center of the spool engaging member so that the spool engaging member rotates coaxially with the spool;

a wind-up knob on the ceiling plate, having a rotation center eccentric to the rotation center of the spool engaging member and comprising a second eccentric engagement member to engage the first eccentric engagement member of the spool engaging member; and a wind-up knob guide to maintain the rotation center of the wind-up knob so that the wind-up knob rotates the spool engaged with the spool engaging member through an engagement between the first eccentric engagement member and the second eccentric engagement member while eccentrically rotating, wherein both of the spool engaging member guide and the wind-up knob guide are mounted on the ceiling plate so as to form a single body with the ceiling plate.

2. The film unit of claim 1 wherein the first eccentric engagement member is a first rotatable gear and the second eccentric engagement member is a second rotatable gear whose rotation center is eccentric to a rotation center of the first rotatable gear so that the spool engaging member and the wind-up knob are engaged with each other with a gear engagement between the first rotatable gear and the second rotatable gear.

3. The film unit of claim 2 wherein the first rotatable gear comprises external gear teeth, the second rotatable gear comprises internal gear teeth whose number is larger than that of the external gear teeth, and the external gear teeth engages with the internal gear teeth.

4. The film unit of claim 3 wherein the wind-up knob guide comprises an inner guide provided at an upper section of the film wind-up chamber and located between the external gear teeth and the internal gear teeth.

5. The film unit of claim 4 wherein the inner guide is a protrusion shaped in the form of a crescent.

6. The film unit of claim 1 wherein the spool engaging member comprises a protrusion as the first eccentric engagement member, the wind-up knob is provided with a hole section as the second eccentric engagement member, and the protrusion of the spool engaging member engages with the hole section of the wind-up knob.

7. The film unit of claim 1 wherein the spool engaging member comprises a protrusion as the first eccentric engagement member, the wind-up knob is provided with a depression as the second eccentric engagement member, and the protrusion of the spool engaging member engages with the depression of the wind-up knob.

8. The film unit of claim 1 wherein the spool engaging member comprises a protrusion as the first eccentric engagement member, the wind-up knob is provided with an elongated engaging hole as the second eccentric engagement member, and the protrusion of the spool engaging member is inserted in the elongated engaging hole of the wind-up knob so that the protrusion moves along the elongated engaging hole in accordance with the rotation of the wind-up knob.

9. The film unit of claim 2 wherein the spool engaging member the first rotatable gear comprises internal gear teeth, the wind-up operating member the second rotatable gear comprises external gear teeth whose number is smaller than that of the internal gear teeth, and the internal gear teeth engages with the external gear teeth.

10. The film unit of claim 1 wherein the spool engaging member guide is a cylindrical protrusion.

11. The film unit of claim 1 wherein the wind-up knob guide is a cylindrical protrusion.

12. The film unit of claim 1, wherein the film unit has an operation surface and the wind-up knob is located to be eccentric from the rotation center of the spool toward the operation surface side and engages with the spool engaging member.

13. The film unit of claim 1, wherein on a top surface of the film wind-up chamber is provided with a engaging protrusion to engage with the spool engaging member and a shaft supporting section located away from the engaging protrusion in the eccentric direction of the wind-up knob from the rotation center of the spool, and wherein the spool engaging member is positioned above the engaging protrusion, the shaft supporting section is positioned between a part of the wind-up knob and a part of the spool engaging member, and the wind-up knob and the spool engaging member are engaged with a gear engagement.

14. The film unit of claim 1, wherein a part of the wind-up knob is arranged so as to overlap a part of the spool engaging member.

15. A body of a film unit provided with a photographic lens, comprising:

an unexposed film chamber in which an unexposed film is accommodated;

the photographing lens through which the unexposed film is imagewise exposed;

a film wind-up chamber in which a film cartridge having a rotatable spool therein is detachably accommodated, wherein the film wind-up chamber comprises a ceiling plate having an engaging hole;

a spool engaging member on the ceiling plate, having a rotation center axial with a rotation center of the rotatable spool, and comprising an engaging piece and a first eccentric engagement member, the engaging piece adapted to detachably coaxially engage the rotatable spool through the hole of the ceiling plate;

a spool engaging member guide to maintain the rotation center of the spool engaging member so that the spool engaging member rotates coaxially with the rotatable spool;

a wind-up knob on the ceiling plate, having a rotation center eccentric to the rotation center of the spool engaging member and comprising a second eccentric engagement member to engage the first eccentric engagement member of the spool engaging member; and a wind-up knob guide to maintain the rotation center of the wind-up knob so that the wind-up knob rotates the rotatable spool engaged with the spool engaging member through an engagement between the first eccentric engagement member and the second eccentric engagement member while eccentrically rotating, wherein both of the spool engaging member guide and the wind-up knob guide are mounted on the ceiling plate so as to form a single body with the ceiling plate.

* * * * *